INVENTOR.
CORNELIS VAN DER LELY
BY
Mason, Mason & Albright
Attorneys

INVENTOR.
CORNELIS VAN DER LELY
BY
Mason, Mason & Albright
Attorneys

INVENTOR.
CORNELIS VAN DER LELY
BY
Mason, Mason & Albright
Attorneys

INVENTOR.
CORNELIS VAN DER LELY
BY
Mason, Mason & Albright
Attorneys

INVENTOR.
CORNELIS VAN DER LELY
BY
Mason, Mason & Albright
Attorneys

May 4, 1965 C. VAN DER LELY 3,181,290

TEDDERS

Filed Jan. 26, 1962 10 Sheets-Sheet 6

INVENTOR.
CORNELIS VAN DER LELY
BY
Mason, Mason & Albright
Attorneys

May 4, 1965 C. VAN DER LELY 3,181,290

TEDDERS

Filed Jan. 26, 1962 10 Sheets-Sheet 7

INVENTOR.
Cornelis van der Lely
BY
Mason, Mason & Albright
Attorneys

May 4, 1965 C. VAN DER LELY 3,181,290

TEDDERS

Filed Jan. 26, 1962 10 Sheets-Sheet 8

INVENTOR.

CORNELIS VAN DER LELY

BY

Mason, Mason & Albright

Attorneys

INVENTOR.
CORNELIS VAN DER LELY
BY
Mason, Mason & Albright
Attorneys

INVENTOR.
CORNELIS VAN DER LELY
BY
Mason, Mason & Albright
ATTORNEYS 3,181,290
TEDDERS
Cornelis van der Lely, Zug, Switzerland, assignor to C. van der Lely N.V., Maasland, Netherlands, a Dutch limited-liability company
Filed Jan. 26, 1962, Ser. No. 169,007
Claims priority, application Netherlands, May 18, 1961, 264,940
20 Claims. (Cl. 56—372)

This invention relates to implements, such as tedders, for working crop or like material, the implements being of the kind comprising a frame movable over the ground and a crop-working body journalled in the frame so as to be rotatable about a substantially horizontal axis.

According to the invention, there is provided an implement of the kind set forth, wherein at least one guide member is provided at the rear of the implement with respect to the intended direction of travel thereof, the guide member or members being arranged in such a way that crop or like material displaced during operation of the implement is deposited on one or more strips of ground whose total width is substantially less than the width of the strip worked by the implement; the guide member being afforded by a plurality of superposed rods which extend rearwardly of the implement when they are in use, some or all of the rods having substantially straight portions adjacent their free ends and the arrange-being such that a substantially straight portion is inclined to a vertical plane containing the equivalent portion of a rod above it.

Figure 1:
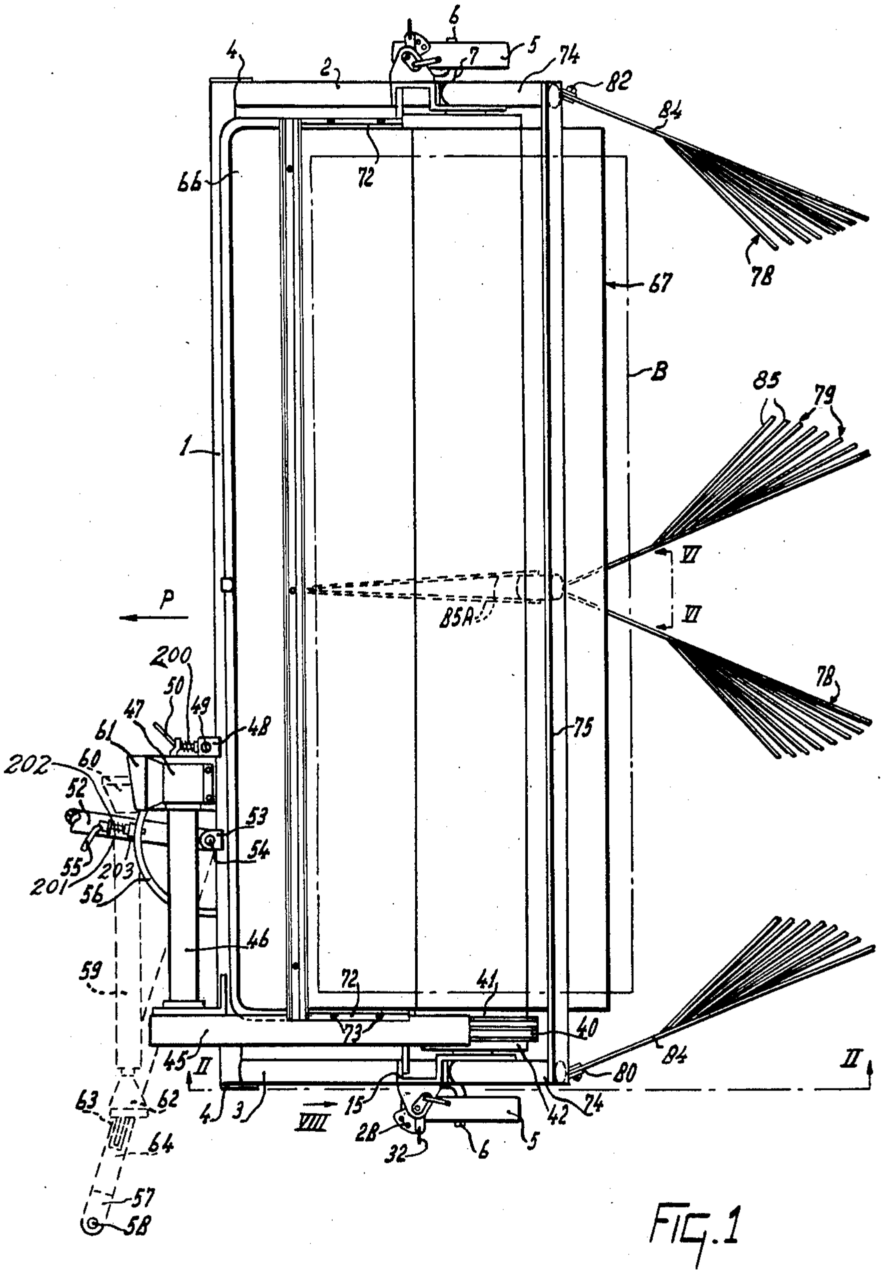
Figure 2:
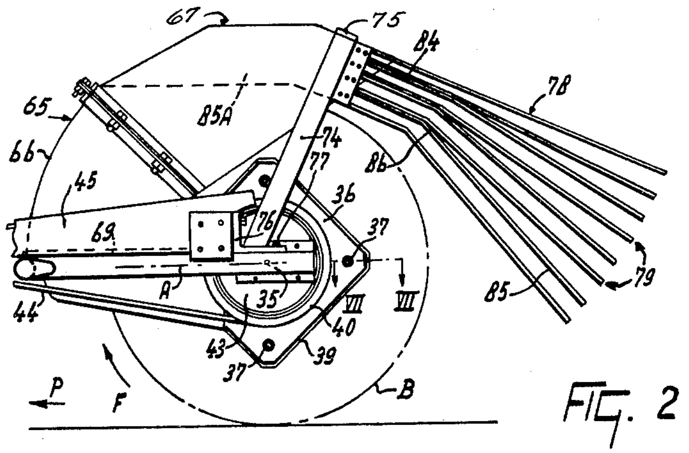
Figure 3:
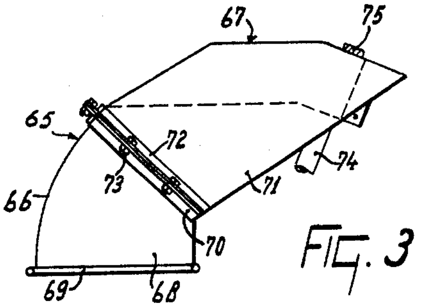
Figure 4:
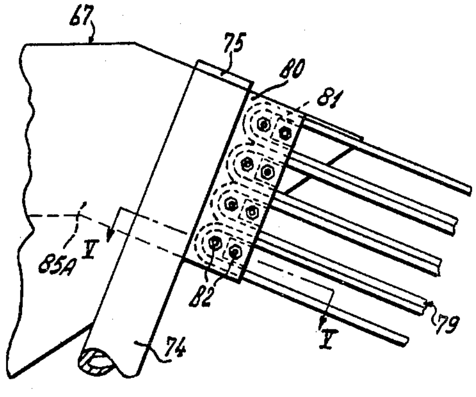
Figure 5:
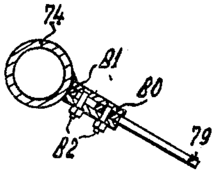
Figure 6:
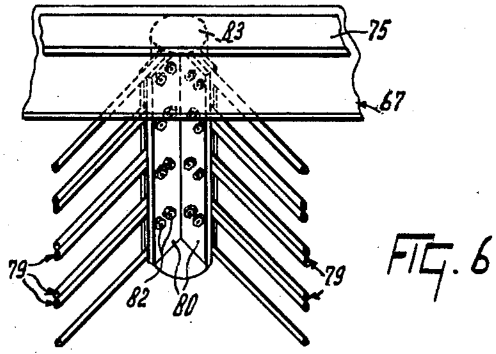
Figure 8:
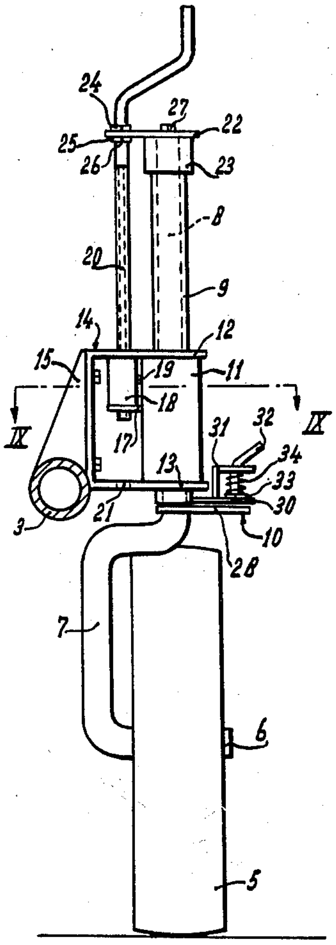
Figure 7:
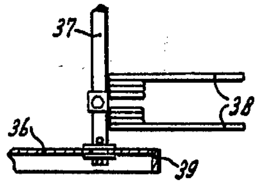
Figure 9:
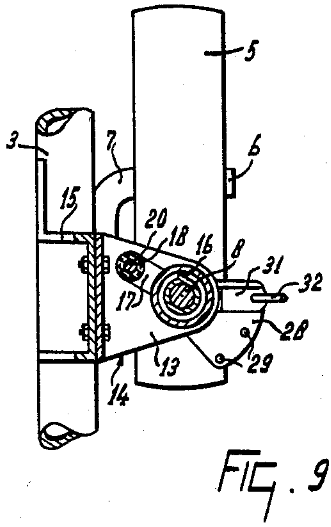
Figure 10:
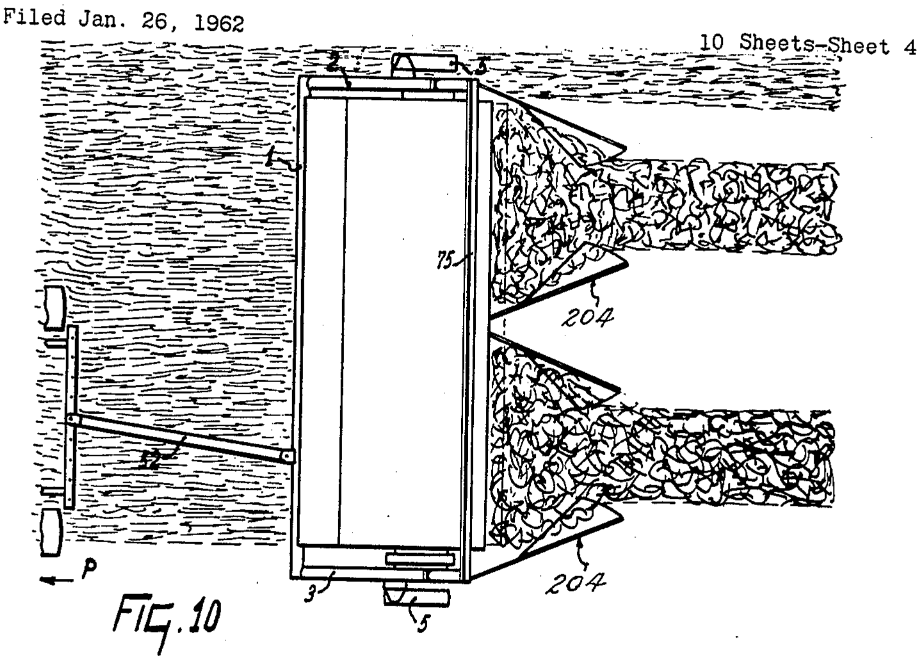
Figure 11:
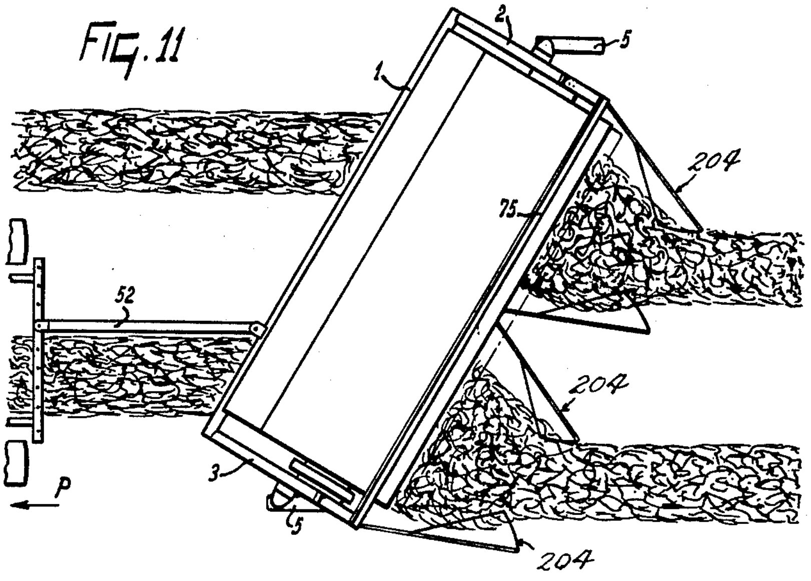
Figures 12, 13, 14, 15, 16:
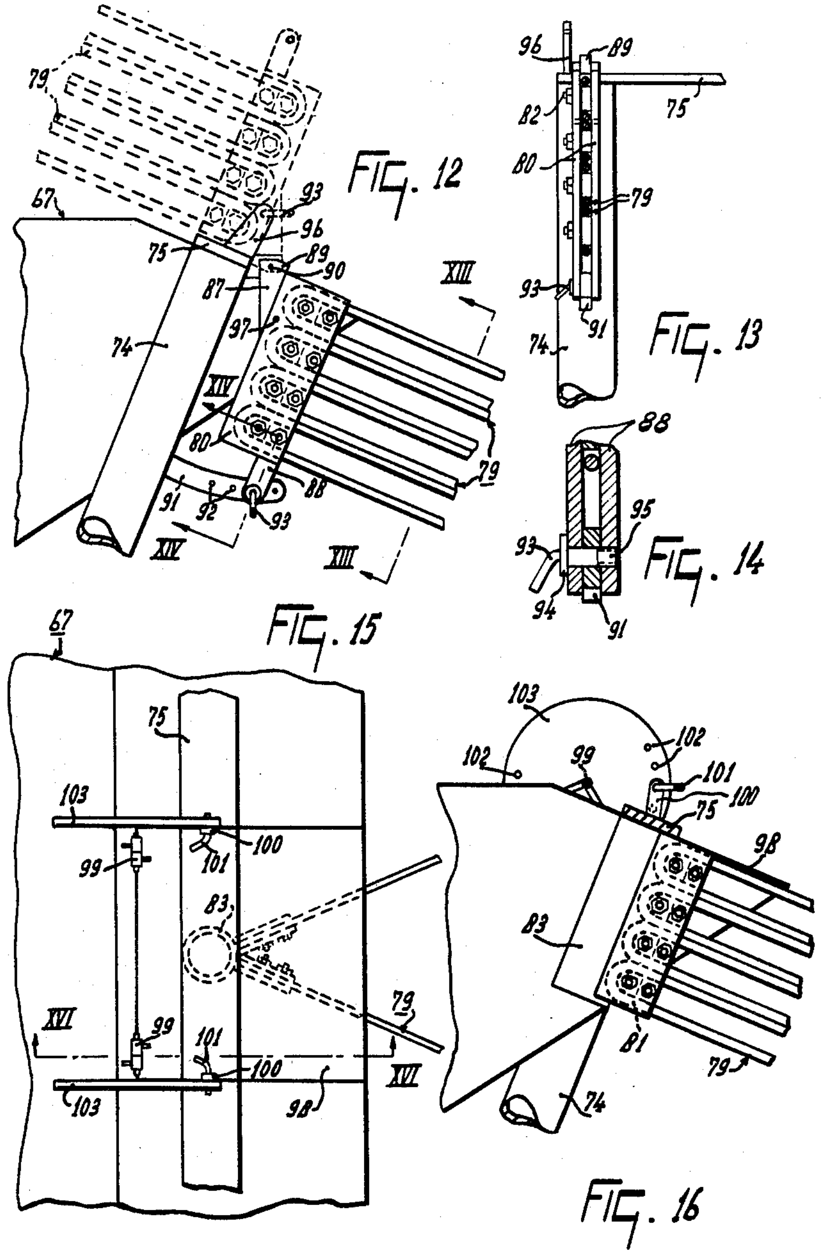
Figures 17, 18:
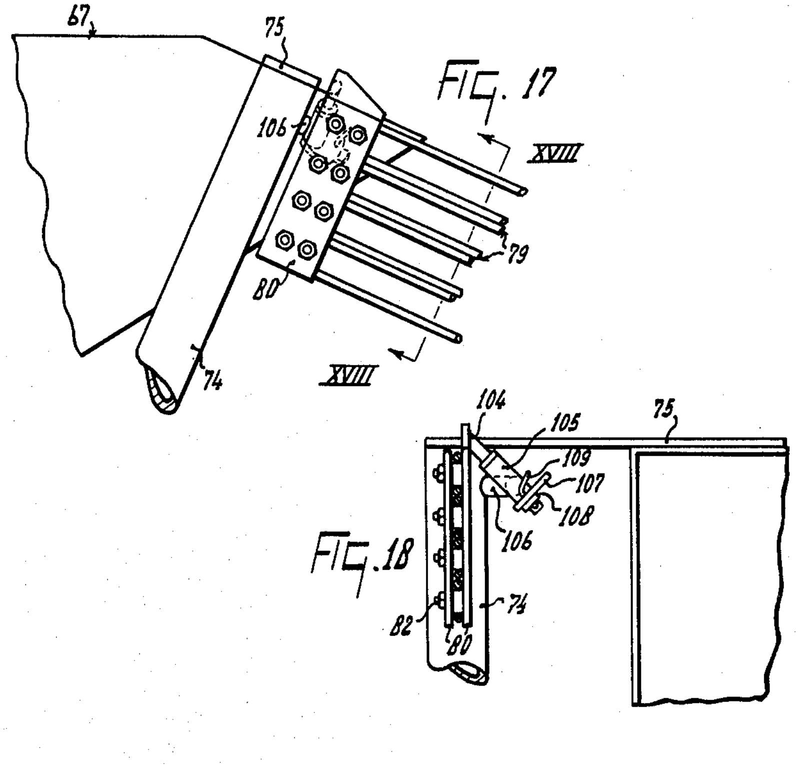
Figure 19:
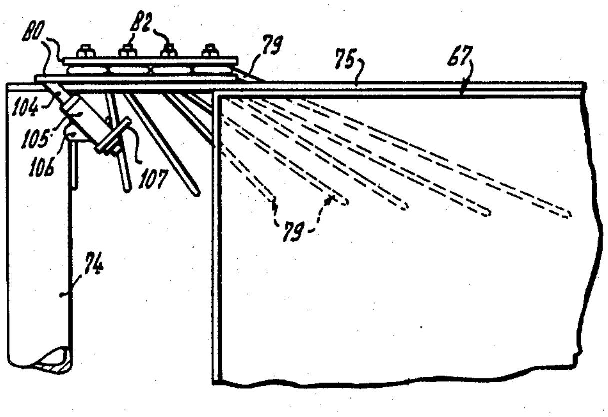
Figure 20:
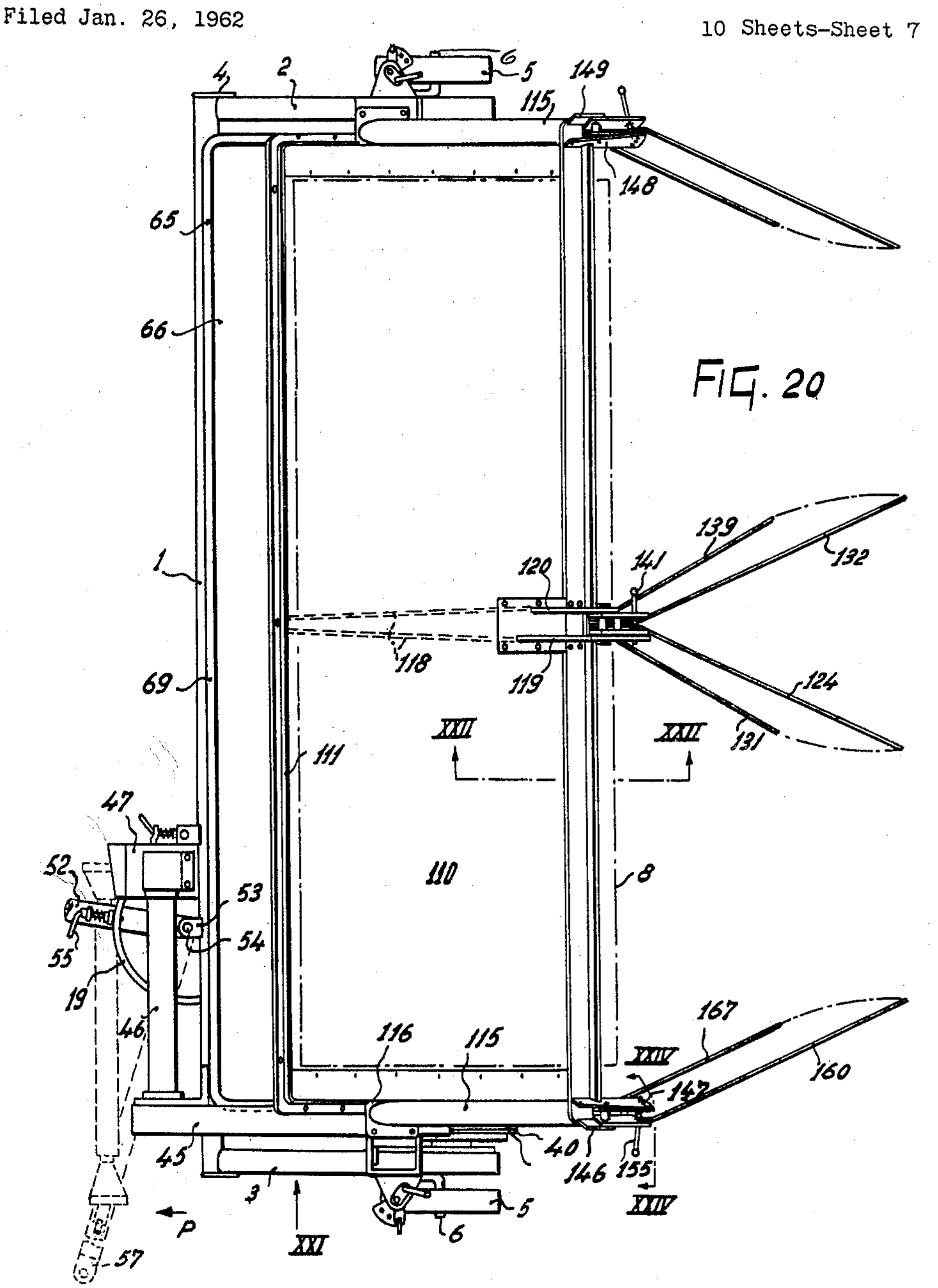
Figure 21:
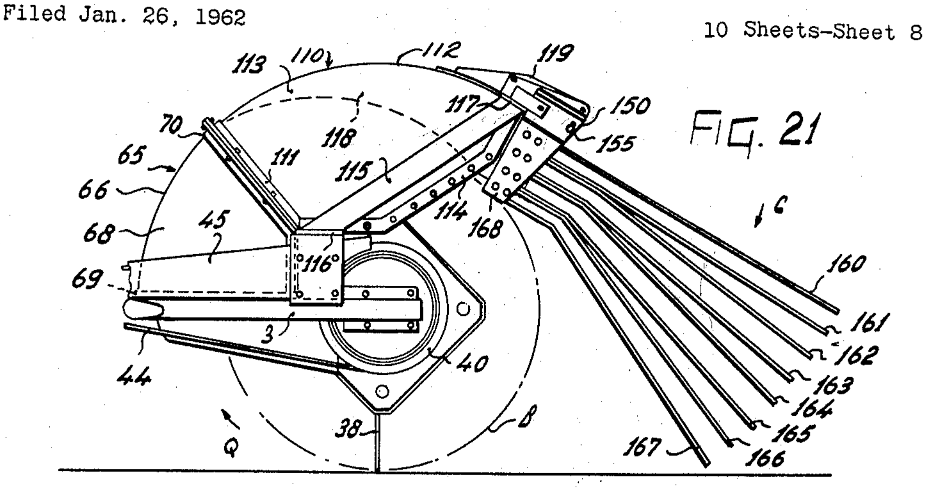
Figure 22:
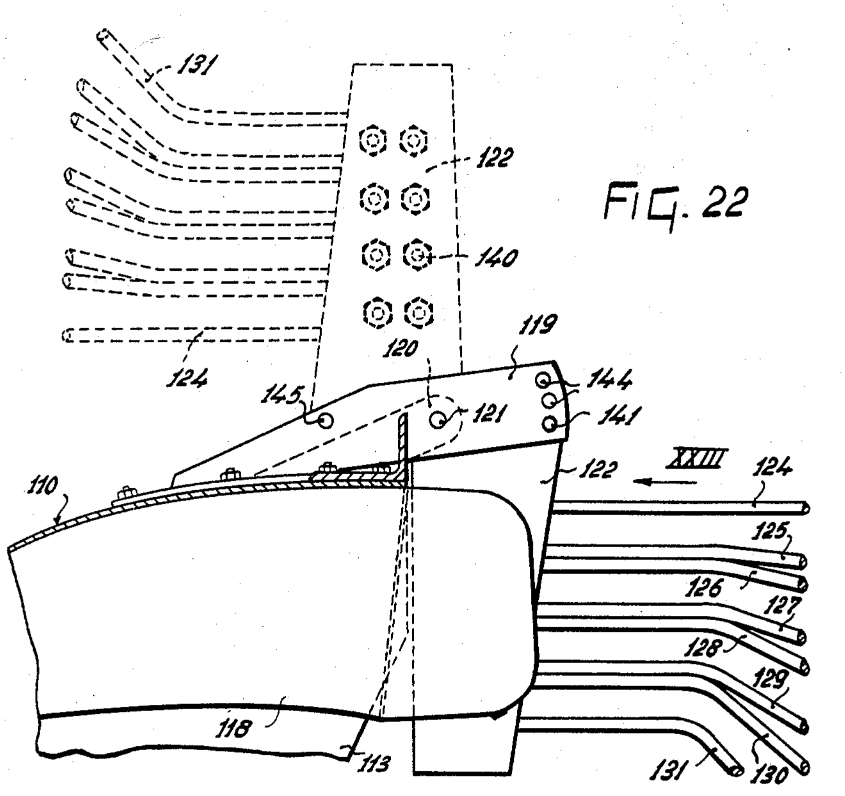
Figure 23:
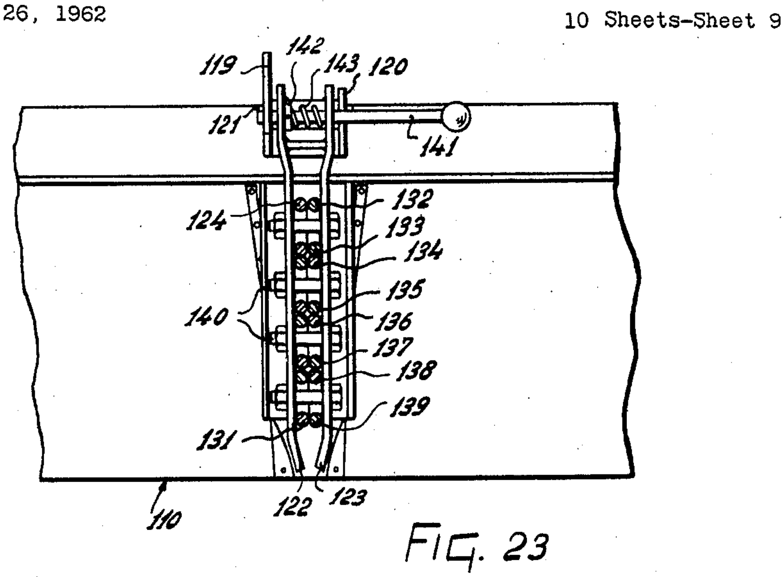
Figure 24:
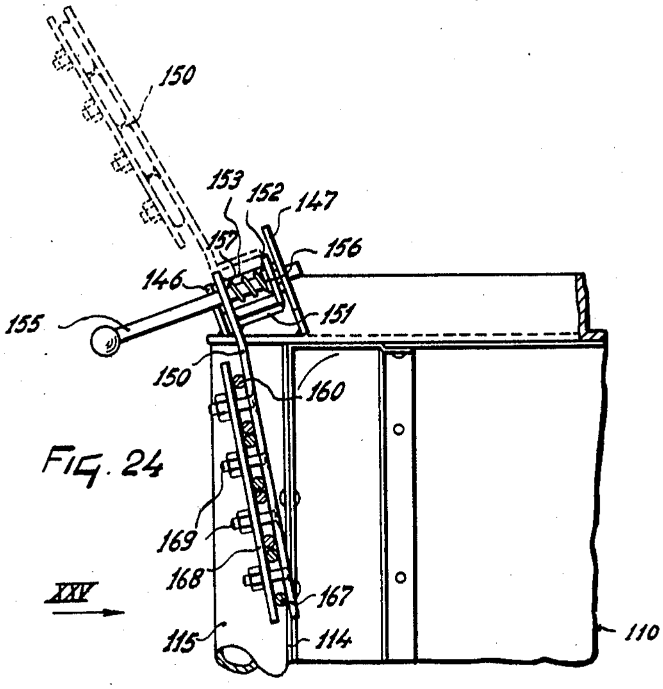
Figure 25:
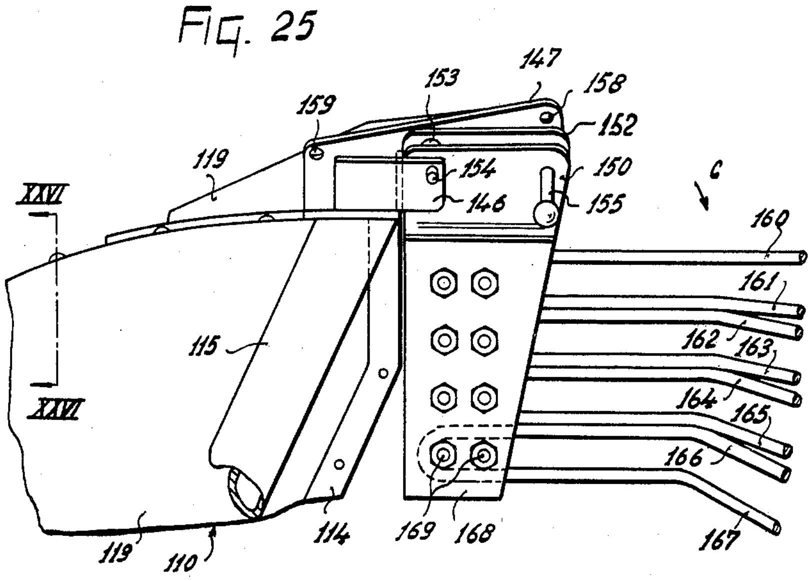
Figure 26:
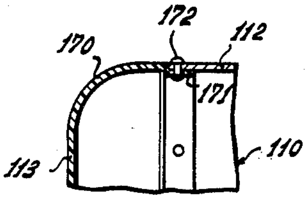

For better understanding of the invention, and to show how the same may be carried into effect, reference will now be made, by way of example, to the accompanying drawings, in which:

FIGURE 1 is a plan view of a tedding implement in accordance with the invention, FIGURE 2 is a side elevation of the implement taken on the line II—II of FIGURE 1, FIGURE 3 is a side elevation showing part of the implement of FIGURES 1 and 2 in greater detail, FIGURE 4 is a side elevation but showing only part of the implement of FIGURE 2 to an enlarged scale and in greater detail, FIGURE 5 is a section omitting certain parts to illustrate more clearly the beam having tines mounted thereon taken on the line V—V of FIGURE 4, FIGURE 6 is a view, to an enlarged scale, taken in the direction indicated by the line VI—VI of FIGURE 1, FIGURE 7 is a section, to an enlarged scale, taken on the line VII—VII of FIGURE 2, FIGURE 8 is a view, to an enlarged scale, taken in the direction indicated by the arrow VIII of FIGURE 1, FIGURE 9 is a section taken on the line IX—IX of FIGURE 8, FIGURE 10 is a diagrammatic plan view showing one mode of operation of the implement, FIGURE 11 is a view similar to FIGURE 10 but shows an alternative mode of operation of the implement, FIGURE 12 is a view similar to FIGURE 4 but shows an alternative embodiment of certain parts of the implement, FIGURE 13 is a section taken on the line XIII—XIII of FIGURE 12, FIGURE 14 is a section to an enlarged scale taken on the line XIV—XIV of FIGURE 12, FIGURE 15 is a plan view of the implement in part and shows an alternative embodiment of certain parts of the implement, FIGURE 16 is a section taken on the line XVI—XVI of FIGURE 15, FIGURE 17 is a view similar to FIGURES 4 and 12 but shows a further alternative embodiment of certain parts of the implement,

FIGURE 18 is a section taken on the line XVIII—XVIII of FIGURE 17,

FIGURE 19 is a view similar to FIGURE 18 but shows parts of the implement in different relative positions, FIGURE 20 is a plan view of a second embodiment of a tedding implement in accordance with the invention, FIGURE 21 is a side elevation with parts broken away of the implement as seen in the direction indicated by the arrow XXI of FIGURE 20, FIGURE 22 is a section, to an enlarged scale, taken on the line XXII—XXII of FIGURE 20, FIGURE 23 is a view taken in the direction indicated by the arrow XXIII of FIGURE 22, FIGURE 24 is a section, to an enlarged scale, taken on the line XIV—XIV of FIGURE 20, FIGURE 25 is a view taken in the direction indicated by the arrow XXV of FIGURE 24, and FIGURE 26 is a section taken on the line XXVI—XXVI of FIGURE 25.

The frame of an implement shown in FIGURES 1 and 2 is comprised principally by a frame beam 1 and by two further frame beams 2 and 3 which are perpendicularly secured to the opposite ends of the frame beam 1 with the aid of plates 4 which extend for a short distance along the frame beams 2 and 3 and which are welded to both the frame beam 1 and the frame beams 2 and 3 so as to enhance the rigidity of the whole frame.

Two ground wheels 5 are connected to the free ends of the frame beams 2 and 3, respectively, the details of the connection being shown in greater detail in FIGURES 8 and 9 in respect of the ground wheel which is connected to the frame beam 3. The connection of the other ground wheel to the frame beam 2 is substantially identical. The ground wheel 5 is rotatably mounted on a horizontal axle 6 which is integrally connected by way of an inclined portion 7 to a vertical shaft 8. Since the longitudinal axis of the axle 6 is spaced from that of the shaft 8, the ground wheel 5 is a caster wheel. The vertical shaft 8 is rotatably journalled in a sleeve 9 which is itself slidable vertically in a cylindrical sleeve 17 supported between the horizontal limbs 12 and 13 of a forked bracket 14. The forked bracket 14 is bolted to a support 15 rigidly mounted upon the frame beam 3. The surface of this sleeve 9 is formed with a longitudinally extending ridge 16 (FIGURE 9) which cooperates with correspondingly shaped recesses in the limbs 12 and 13 to prevent the sleeve 9 turning relative to the cylindrical sleeve 11.

A lug 17 projects from the cylindrical sleeve 11 and an internally screw-threaded tub 18 is loosely supported between this lug and the upper limb 12 of the bracket 14. The screw-threaded shank of a spindle 20 is entered through a hole in the limb 12, the tube 18 and a further aligned hole in the lug 17. In addition, a still further hole 21 is formed in the lower limb 13 in alignment with the holes just mentioned. A stop 19 projects from the side of the tube 18, the stop 19 being formed with a concave recess which engages the convex surface of the cylindrical sleeve 11. The said stop 19 acts to prevent the tube 18 from rotating about its longitudinal axis.

The uppermost plain end of the spindle 20 is entered through a hole in a horizontal plate 22 which is secured to a socket 23 placed over the upper end of the sleeve 9. Rings 24 and 25 are secured to the spindle 20 immediately above and below the plate 22 with the aid of transverse pins 26 so that the spindle 20 can be rotated with the aid of its crank handle but cannot move axially. A bolt 27 is passed through a hole in the plate 22 and is screwed into the uppermost end of the shaft 8. The head of the bolt 27 thus maintains the shaft 8 against axial displacement relative to the sleeve 9.

A locking member generally indicated by the reference numeral 10 is provided to enable the plane of rotation of the wheel 5 to be retained in any one of a number of different angular settings. The locking member 10 comprises a sector plate 28 secured to the lowermost end of the shaft 8, the sector plate being formed with a number of holes 29 which are spaced at equal distances from the shaft 8. The locking member 10 also includes an arm 30 which projects from the lowermost end of the sleeve 9 immediately above the sector plate 28, the arm 30 carrying a bracket 31 which, together with the arm 30, supports a vertically disposed locking pin 32. The arm 30 and bracket 31 have vertically aligned holes through which the locking pin 32 is taken and these holes can be brought into register with any one of the holes 29. A compression spring 34 surrounds the locking pin 32 and bears between the lower sides of the horizontal limb of the bracket 31 and a collar 33 rigidly secured to the locking pin 32. Thus, the tip of the locking pin 32 is urged downwardly by means of the spring 34 into engagement with the plate 28. Obviously, upon the insertion of the tip of the locking pin 32 in one of the holes 29, the plane of rotation of the ground wheel 5 will be retained in a corresponding angular setting.

A drum-shaped tined body is rotatably journalled in the frame of the implement and comprises a shaft 35 to which a number of square plates 36 are secured in relatively spaced relationship. Support rods 37 (FIGURES 2 and 7) interconnect the corresponding corners of the plates 36 and carry a plurality of tines 38. The two plates 36 disposed at the opposite ends of the shaft 35 are each provided with a marginal strip 39 which projects outwardly from the end of the tined body (see FIGURE 7) in a direction substantially perpendicular to the planes of the plates 36. The two strips 39 are arranged to prevent loose crop or like material from becoming wound around the plates 36 during operation of the implement.

A pulley 40 is secured to one end of the shaft 35 and has two cylindrical rims 41 and 42 which project from opposite sides thereof in directions parallel to the said shaft. A plate 43 (FIGURE 2) having a diameter very slightly less than the internal diameter of the rims 41 and 42 is secured to the frame of the implement and is disposed within the cylindrical interior of the pulley 40. This arrangement also tends to prevent crop or other loose material from becoming entangled in the relatively moving parts of the implement during its operation. A further screening rim, similar to the rims 41 and 42, is secured to the end of the shaft 35 remote from the pulley 40 and a further plate, similar to the plate 43, is disposed within the interior of this rim. The pulley 40 is linked by means of two V-section belts or ropes 44 to a further pulley mounted inside a protective casing 45. The latter pulley is secured to one end of a shaft which extends parallel to the frame beam 1 within a cylindrical casing 46. The opposite end of the shaft is connected to the output shaft of a gear transmission 47.

A vertical slideway 48 is secured to the leading side of the frame beam 1 and a vertical rod 49 is slideable therein. The tip of a spring-loaded locking pin 50 with spring 200 projects through a hole in the side of the bore of the slideway 48 and can enter any one of a number of holes, grooves or the like formed in the rod 49 at different levels. The lowermost end of the rod 49 carries a plate (not shown) which is adapted to form a third support point, in conjunction with the two ground wheels 5, at times when the implement is not coupled to a vehicle. The rod 49 is formed with a groove, hole or the like in such a position that, when the tip of the locking pin 50 is entered therein, the plate is located at a level well clear of the surface of the ground. This setting of the rod 49 is employed when the implement is in use.

A forked bracket 53 is secured to the same side of the frame beam 1 as the slideway 48 and carries a substantially vertical pivot pin 54 about which a drawbar 52 is turnable. A spring-loaded horizontal locking pin 55 with spring 201 is mounted on the upper side of the draw-bar 52 with the aid of two relatively spaced lugs 202 and 203, the tip of the locking pin 55 being urged into engagement with one side of a semi-cylindrical strip 56 which is also secured to the frame beam 1 and whose center of curvature is afforded by the pivot pin 54. The strip 56 is formed with a number of holes in any one of which the tip of the locking pin 55 can be entered to retain the draw-bar 52 in a corresponding angular setting about the pivot pin 54. The free end of the draw-bar 52 is provided with a fork 57 having a pair of vertically aligned holes 58 adapted to co-operate with a tow-bar or the like to connect the implement to a vehicle, such as a tractor.

A conventional arrangement of shafts and universal joints (not shown) can connect the gear transmission 47 to a power take-off. The arrangement is enclosed within casing 59 and hoods 60, 61 and 62. The parts 59, 60, 62 and 63 are shown in broken lines in FIGURE 1 in a position in which they are suitably disposed for transport of the implement. The coupling 63 is afforded by an internally splined sleeve adapted to co-operate with the corresponding external splines provided on the power take-off shafts of tractors and like vehicles.

During operation of the implement, the casing 59, together with the hoods 60 and 62, is turned about a shaft of the universal joint, which extends substantially vertical in the transport position, into a position in which the casing 59 projects forwardly of the implement. The coupling 63 can then be connected to the power take-off shaft of the tractor or like vehicle which is to draw the implement over the ground. The upper side of the draw bar 52 carries a bracket 64 shown in dotted lines in FIGURE 1 having a vertical limb and a horizontal limb. The arrangement is such that, when the draw-bar 52 is turned about the pivot pin 54 into a position in which it is suitably disposed for transport of the tedder, this position being shown in broken lines in FIGURE 1, the casing 59 can be moved to a position in which the coupling 63 will co-operate with the bracket 64 to retain said coupling together with its associated parts in a fixed position relative to the draw-bar 52. It will be apparent that this position is arrived at by turning the draw-bar 52 to an intermediate position in which the coupling 63 and bracket 64 are just in register whereafter, upon turning the draw-bar 52 further about the pivot pin 54 to the position shown in broken lines in FIGURE 1, the coupling 63 will be urged into engagement with the horizontal limb of the bracket 64. The horizontal limb of the bracket 64 is preferably so shaped that it slides into engagement with a relatively opposite pair of the internal splines formed within the coupling 63. A hole is, of course, formed in the strip 56 for co-operation with the locking pin 55 in the position of the draw-bar 52 shown in broken lines.

As can be seen in FIGURE 1, the free end of the draw-bar 52 projects to one side of the implement when the draw-bar is suitably disposed for transport of the implement. The plane of rotation of the ground wheel 5 farthest from the draw-bar 52 is preferably retained in an angular setting in which it extends parallel to the draw-bar 52 whereas the other ground wheel 5 is left as a free castor wheel. During transport, the disposition of the implement is such that it lies mainly within the path of travel of the tractor or other vehicle which is towing it.

The gear transmission 47 and the other parts by which drive is transmitted to the tined body are so arranged that, during operation of the implement, the said body rotates in the direction indicated by the arrow F in FIGURE 2 while the implement is itself travelling in the general direction indicated by the arrow P. It will thus be seen that the tines 38 which, at any instant, are located in the region of the body which is in contact with the ground, are moving in substantially the same direction as the direction P. A hood-shaped screening baffle 65 is disposed in front of the tined body relative to the intended direction of travel P, the lower edge of the baffle being disposed at approximately the same level as the shaft 35 and the whole of the baffle subtending an angle of about 45° at the said shaft.

The baffle 65 comprises a plate 66 which has a curved cross-section (see FIGURES 2 and 3), the center of curvature of the said plate being co-incident with the longitudinal axis of the shaft 35. The sides or ends of the baffle 65 are afforded by plates 68 which lie in planes disposed at right angles to the axis of the shaft 35. The baffle 65 is stiffened by tubes 69 and angle irons 70 which extend around its lower and upper edges, respectively. A further hood-shaped screening baffle 67 is secured to the baffle 65 and extends therefrom over and above the tined body and subtends an angle of approximately 75° at the axis of the shaft 35. The hood 67 is formed in such a way that it has three relatively inclined flat portions each of which extends substantially parallel to the shaft 35, the portions being so arranged that the lines of intersection between them all lie at substantially the same perpendicular distance from the shaft 35 as does any point on the curved plate 66 of the baffle 65. The sides or ends of the baffle 67 are afforded by plates 71 which extend parallel to the plates 68.

It will be seen from FIGURES 2 and 3 that the side or end plates 68 extend downwardly to the frame beams 2 and 3 whereas the side or end plates 71 do not. The lower edge of the baffle 67 is stiffened by angle irons 72 which abut against the angle irons 70 and which are secured thereto with the aid of bolts 73. Towards the rear (with respect to the direction P) of the baffle 67, the plates 71 have obliquely descending beams 74 secured to them, the uppermost ends of the two beams 74 being interconnected by a transverse strip 75 which extends across one of the portions of the baffle 67 and is secured thereto. The lowermost ends of the beams 74 are provided with angle irons 76 which are secured to the frame beams 2 and 3 with the aid of bolts 77.

Guide members 78 in the form of groups of guide rods 79 are arranged near the opposite ends of the baffle 67 and also near to its center. There is a single guide member 78 arranged at each end of the baffle and a pair of guide members arranged at its center. The guide members 78 are arranged to define two convergent funnel-shaped passages for crop or like material displaced by the implement during its operation. The guide rods 79 are arranged one above the other and extend rearwardly from the baffle 67 relative to the direction P. The rods 79 are made in integral pairs from single lengths of spring steel, each rod having one free end. The connecting portions 81 (FIGURES 4 and 5) between the pairs of rods 79 are disposed one above the other between two plates 80 which are secured to the upper ends of the beams 74 alongside the plates 71 of the hood 67. The plates 80 are drawn together into clamping engagement with the portions 81 by means of pairs of bolts 82. The pairs of clamping plates at the opposite ends of the baffle 67 converge towards each other considered in a direction opposite to the direction P. Two pairs of plates 80 are provided at the center of the baffle 67 (see FIGURE 6), the plates being secured to a tube 83 which is itself fastened to the baffle 67. The arrangement is otherwise similar to that of the rods 79 disposed at the opposite ends of the baffle 67.

When seen in plan view (FIGURE 1) all the rods 79 of each guide member 78 have parts 84 which lie in a single substantially vertical plane, this plane being inclined at an acute angle to the longitudinal axis of the shaft 35. The uppermost rod 79 in each group is substantially straight throughout its length but the rods which lie beneath it are each bent at a point 86 (FIGURE 2) so that a part 85 is inclined to the substantially vertical plane which has just been mentioned. Thus, the distance between the rods 79 of two converging groups decreases progressively considered from the top to the bottom of the groups. As can be seen in FIGURE 2, viewed in the longitudinal direction of the shaft 35, the uppermost rod 79 in each group is inclined rearwardly and downwardly at an angle of approximately 30° to the horizontal from the baffle 67. The said rod is substantially co-planar with the portion of the baffle 67 across which the strip 75 extends. The length of this rod is approximately equal to the diameter of the cylindrical figure B generated by the tips of the tines 38 during rotation of the body about the shaft 35. Moreover, the free end of the uppermost rod 79 of each guide member 78 is spaced from a vertical plane containing the longitudinal axis of the shaft 35 by approximately one and a half times the diameter of the figure B. Viewed in a direction parallel to the longitudinal axis of the shaft 35 (FIGURE 2), the parts 84 of the rods 79 below the uppermost rod extent parallel to the said uppermost rod while the parts 85, which afford approximately two thirds of each rod, extend obliquely downwardly in fan-shaped relationship. The lengths of the parts 84 decrease from top to bottom of the rods 79 of each group so that all the points 86 of each group are located on a line inclined to the intended direction of travel of the implement.

As can be seen in FIGURE 4, the parts 84 of neighboring rods 79 engage each other laterally until the points 86 are reached. The free end of the lowermost rod 79 in each group is spaced from a vertical plane containing the longitudinal axis of the shaft 35 by a distance approximately equal to the diameter of the cylindrical figure B. Two plates 85A (FIGURES 1 and 2) extend forwardly relative to the direction P from the tube 83 on the concave or inner side of the baffle 67. The plates 85A each extend approximately perpendicular to the longitudinal axis of the shaft 35 but, in fact, they converge slightly in the intended direction of travel of the implement so that they meet adjacent the angle iron 72. The height of the plates 85A is approximately the same as the height of each guide member 78 at the rear end of the baffle 67 but decreases progressively towards the angle iron 72. The baffle 67, together with the guide members 78, can readily be removed from the implement merely by loosening the bolts 73 and 77.

The guide members may be afforded by plates 204 instead of groups of rods 79. An example of such a construction is shown diagrammatically in FIGURES 10 and 11 from which it can be seen that the front parts of the plates, considered in the direction P, are located in vertical planes whereas the rear parts thereof are inclined to the vertical planes. The said rear parts are arranged in two relatively converging pairs, the arrangement being such that, in plan view, the distance between the said parts of each pair becomes progressively less considered from the top to the bottom of the guide members. The size and general shape of a guide member of this kind corresponds to the size and shape of a guide member of the kind formed by a group of rods 79.

During operation of the implement, crop which is entrained by the tines 38 during their movement over the ground in the direction F (FIGURE 2) is moved upwardly and rearwardly over the tined body. The crop moves along the inner or concave surfaces of the baffles 65 and 67 and is partially divided into two portions by the plates 85A. The last portion of the baffle 67 is inclined downwardly so that the crop or the like moves in a similar direction as it leaves the baffle. As can be seen in FIGURE 10, the crop or like material then enters the two converging spaces between the guide members 78 and is formed into two relatively spaced swaths which are deposited upon the ground in similarly spaced relationship. The shape of the guide members 78 is such that they support the crop or like material to a greater or lesser extent during its passage therebetween. Thus, at least a portion of the crop does not immediately fall to the ground but is carried along with the implement for a certain distance. This has been found to lead to the formation of uniform diffuse swaths which is conductive to the drying of the crop or the like. If desired, the guide members 78 at the center of the baffle 67 may be omitted so that the implement forms a single swath whose width is substantially less than the width of the strip of land which the implement is working.

By suitable adjustment of the locking pins 32 and 55, the implement can be brought to the working position shown in FIGURE 11 in which position it performs a combined tedding and swath-turning action. As can be seen in FIGURE 11, the crop or like material leaves the implement in a direction which is inclined to the direction P so that the two swaths which are being worked are moved laterally to adjacent dry strips of ground which were previously clear. This accelerates drying of the crop or like material. The spindles 20 can be adjusted in any working position of the implement to bring the tined body to the most satisfactory height above the surface of the ground. Upon turning one of the spindles 20, the corresponding cylindrical sleeve 11 is either raised or lowered relative to the associated sleeve 9 which sleeve occupies a fixed position vertically relative to one of the ground wheels 5.

FIGURES 12 to 19 illustrate modifications of the implement which has previously been described in which the guide rods 79 are adjustable about non-vertical axes. FIGURES 12 to 16 show an embodiment in which the guide members at both the ends and the center of the baffle 67 are adjustable about substantially horizontal axes. The plates 80 are provided at their upper ends with lugs 87 and at their lower ends with lugs 88. The tops of the beams 74 are provided with lugs 89, a lug 89 being so arranged that it lies between two lugs 87. A pivot pin 90 is entered through aligned holes formed in these lugs, the pin 90 extending substantially parallel to the longitudinal axis of the shaft 35. The lugs 87, together with the plates 80 and rods 79, are turnable about the pivot 90. Each beam 74 is also provided with an arcuate strip 91 whose center of curvature is coincident with the pivot 90. The lugs 88 extend on opposite sides of the strip 91 and are formed with holes which can be brought into register with any one of a plurality of holes 92 formed along the strip. A locking pin 93 can be entered through the holes in the lugs 88 and a chosen one of the holes 92. As can be seen in FIGURE 14, the locking pin 93 has a collar 94 and a screwthreaded tip 95. The hole in one of the lugs 88 is correspondingly screwthreaded so that the locking pin 93 can be screwed into its selected position with the aid of its inclined handle until the stop afforded by the collar 94 abuts against one of the lugs 88. The pin 93 will remain in this position until it is unscrewed in a similar manner. A lug 96 (FIGURE 13) projects upwardly from the strip 75 and is provided with a plain hole through which the locking pin 93 can be passed to retain the rods 79 in the inverted position shown in FIGURE 12. Screwthreaded holes 97 are formed in the plates 80 for the reception of the tip 95 of the locking pin 93 when the inverted position just mentioned is employed.

It can be seen in FIGURES 15 and 16 that a flap 98 of the rearmost portion of the baffle 67 can be turned about a horizontal axis afforded by two small hinges 99. The flap 98 is provided with two lugs 100 which are formed at their free ends with holes that can be brought into register with any one of a number of holes 102 formed around the periphery of sector plates 103 rigidly secured to the upper side of the baffle 67 on opposite sides of the flap 98. The holes 102 are all formed equidistant from the axis afforded by the hinges 99.

The arrangements which have just been described allow the guide rods 79 of the guide members 78 to be fixed in different angular positions and to be substantially entirely inverted so that they bear in part upon the upper surface of the baffle 67. Such a position is shown in respect of one guide member 78 in broken lines in FIGURE 12. The inverted positions of the guide members 78 are employed during transport of the implement and at times when it is desired that the implement should perform a conventional tedding action without the tedded crop or like material being formed into two swaths.

FIGURES 17 to 19 illustrate an arrangement in which the guide rods 79 are turnable about a shaft 104 which is inclined at an angle of about 45° to the horizontal. The direction of inclination of the shaft 104 is such that a prolongation of its longitudinal axis meets the ground, in plan view, between the shaft 35 and the free ends of the guide members 78 and also centrally of the convergent funnel-shaped space between two guide members 78. FIGURES 17 to 19 illustrates the arrangement of the guide rods 79 at one end of the baffle 67. A similar structure may be employed at the center of the baffle 67, a flap similar to the flap 98 being used to allow the guide rods 79 to be turned into a retracted position. A bearing 105 for the shaft 104 is connected to the beam 74 by a support 106 and the shaft 104 is itself rigidly connected to one of the plates 80. The bearing 105 carries a sector plate 107 in which a number of holes are formed. The shaft 104 carries an arm 108 in which a single hole is formed that can be brought into register with any one of the holes in the sector plate 107. A locking pin 109 can be entered through the hole in the arm 108 and a selected one of the holes in the sector plate 107. Thus, the guide rods 79 can be moved vertically and can be retained in any one of a number of different angular settings, one of the settings being such that the rods 79 lie in a flat retracted position on the baffle 67 (FIGURE 19).

FIGURES 20 to 26 illustrate an implement which corresponds in many respects to the implement which has already been described. Accordingly, the same reference numerals are used to indicate identical or similar parts.

A hood-shaped baffle 110 is employed in place of the baffle 67, the baffle 110 having an angle iron 111 around its lowermost edge. The angle iron 111 is secured to the angle iron 70 of the baffle 65 by means of bolts. The baffle 110 includes a curved plate 112 whose center of curvature approximately coincides with the longitudinal axis of the shaft 35 and two end or side plates 113 which are disposed substantially perpendicular to the shaft 35.

The plate 112 extends rearwardly, with respect to the intended direction of travel of the implement, of a vertical plane containing the longitudinal axis of the shaft 35, a plane containing the rearmost edge of the plate 112 and also the longitudinal axis of the shaft 35 being inclined at an angle of approximately 48° to the vertical plane just mentioned. The rearmost edge of each of the plates 113 is formed in three relatively inclined sections, a first section which is inclined at approximately 60° to the horizontal, a second section which is inclined at approximately 150° to the first section and a third section which is approximately horizontal.

Each of the plates 113 has a stiffening strip 114 secured to its lowermost edge while a tube 115 extends alongside each plate 113 between supports 116 and 117 which are fastened to opposite ends of the strip 114.

Two plates 118 extend along the inner or concave surface of the baffle 110 at the centre thereof. The plates 118 diverge very gradually from the angle iron 111 rearwardly of the implement, the rearmost edges of the plates 118 projecting beyond the baffle 110. The height of the plates 118 progressively increases towards the rear of the implement but is always such that the lowermost edges of the plates are disposed above the tips of the tines 38 during rotation of the tined body.

Two supporting arms 119 and 120 are secured to the upper surface of the baffle 110 at the center thereof. The supporting arms 119 and 120 carry a pivot pin 121 which extends parallel to the longitudinal axis of the shaft 35 and to which two support plates 122 and 123 are turnably connected. The inner ends of two groups of guide rods 124 to 131 and 132 to 139 are clamped between the plates 122 and 123 by bolts 140, the rods being made in integral pairs from single lengths of spring steel.

As can be seen in FIGURES 22 and 23, the support plates 122 and 123 are disposed between the supporting arms 119 and 120 and can be moved into the position shown in full lines in FIGURE 22 in which they lie between the rearmost ends of the two plates 118. When the plates 122 and 123 are in this position, the rods which are connected to them are inclined downwardly and extend rearwardly of the implement from the baffle 110. A horizontal locking pin 141 is entered through aligned holes in the plates 122 and 123 and is urged towards the left in FIGURE 23 by means of a coiled compression spring 143 which bears between the plate 123 and a collar 142 secured to the locking pin 141. The arm 119 has greater dimensions than the arm 120 and is provided in the portion thereof which projects rearwardly of the baffle 110 with a series of holes 144 and in the portion thereof which is disposed above the baffle 110 with a single hole 145. The tip of the locking pin 141 can be entered in any one of the holes 144 or in the hole 145. When the locking pin 141 is entered in one of the holes 144, the rods connected to the plates 122 and 123 extend rearwardly of the implement relative to its intended direction of travel whereas, when the locking pin 141 is entered in the hole 145, the said rods extend forwardly above the baffle 110 (see the position of the rods indicated in broken lines in FIGURE 22).

When viewed in a direction parallel to the longitudinal axis of the shaft 35, the topmost rods 124 and 132 are straight whereas the rods below them extend parallel to the rods 124 and 132 over a part of their length and downwardly away from the uppermost rods over a further part of their length. The parallel parts of the rods 125, 126, 127, 128, 129 and 130 and 133, 134, 135, 136, 137 and 138 abut against one another in pairs whereas the rods 124, 131, 132 and 139 do not abut against any other rods. The rods are bent over downwardly in such a way that the distances between the free ends of succeeding rods are approximately the same. In the embodiment illustrated, the distance between the free ends of two neighboring rods is approximately 9.5 centimeters. The length of each rod is about 99 centimeters and the length of that part of each bent over rod which extends parallel to the rods 124 and 132 is approximately 22 centimeters. At a distance of approximately 14 centimeters from the ends of the rods which are secured to the support plates 122 and 123, the said rods are bent over towards the opposite ends of the implement, that is to say, they are oppositely inclined to a plane extending perpendicular to the longitudinal axis of the shaft 35. The rods 124 to 131 are bent towards the left hand end of the implement and the rods 132 to 139 towards the right hand end of the implement considered in the intended direction of travel of the latter. The inclination of these bent over parts of the rods 124 and 125 to the plane extending perpendicular to the longitudinal axis of the shaft 35 is 26°. The corresponding angle in the case of the rods 126 and 127 is 27°. In the case of the rods 128 and 129 it is 28° and in the case of the rods 130 and 131 it is 29°. The rods 132 to 139 are bent over in a symmetrical manner. It will be apparent that the distances of the free ends of the rods from the ground will vary in accordance with the hole 144 in which the tip of the locking pin 141 is entered.

Two pairs of supports 146, 147 and 148, 149 are secured to the opposite ends of the baffle 110. Support plates 150 are turnably connected to the supports, the arrangement being such that the parts at the opposite ends of the baffle 110 are symmetrically arranged relative to a central plane extending perpendicular to the longitudinal axis of the shaft 35. Accordingly, it is only necessary to describe the arrangement of the parts at one end of the baffle 110, this arrangement being shown in FIGURES 24 and 25.

A plate 151 projects at right angles from one end of the support plate 150 and carries a further plate 152 which extends parallel to the side end. A sleeve 153 is disposed between the plate 150 and the plate 152 and accommodates a shaft 154 whose opposite ends are journalled in aligned holes in the supports 146 and 147. The longitudinal axis of the shaft 154, about which the support plate 150 is turnable, is contained in a vertical plane extending parallel to the longitudinal axis of the shaft 35. However, the shaft 154 is inclined in such a way that its axis makes an angle of 20° with the horizontal, the uppermost end of the shaft being disposed closer to the center of the implement. The plates 150 and 152 are also formed with holes in which a locking pin 155 is entered, the locking pin 155 being urged towards the right in FIGURE 24 by means of a coiled compression spring 157 which bears between the plate 150 and a collar 156 fastened to the locking pin 155.

The support 147 has greater dimensions than the support 146 and has a portion projecting rearwardly of the baffle 110. This portion is formed with a plurality of holes 158 whereas a further portion of the same support which lies above the baffle 110 is formed with a single hole 159. The tip of the locking pin 155 can be entered into any one of the holes 158 or 159 so that the support plate 150 can occupy either a position similar to the one shown in full lines in FIGURE 24 or the retracted position shown in broken lines in that figure.

Eight guide rods 160, 161, 162, 163, 164, 165, 166 and 167 are secured to the support plate 150 with the aid of a clamping plate 168 and a plurality of bolts 169. The end of each rod which is adjacent to the plate 150 extends perpendicular to the shaft 154 whereas the same ends of all the rods together lie in a plane which is inclined at an angle of 10° to a plane which is perpendicular to the shaft 154. The uppermost rod 160 is straight throughout its length whereas the rods which lie beneath it each have a part extending parallel to the rod 160 and a part which is bent over towards the center of the implement. Each of these rods 161, 162, 163, 164, 165, 166 and 167 has a total length of about 99 centimeters, the parallel parts each having a length of about 14 centimeters. The inclination of the bent over part of each of the rods 161, 162, 163, 164, 165, 166 and 167 to a plane containing the parallel parts of all the rods 160 to 167 is about 26°. The rods are bent in such a way that the free ends thereof are approximately equally spaced from one another considered in a direction perpendicular to the length of the rod 160. In the embodiment illustrated, the spacing between the free ends of two neighboring rods is about 9.5 centimeters.

The distance of the free ends of the rods above the ground can be adjusted by entering the tip of the locking pin 155 into different ones of the holes 158 and the guide member afforded by the whole group of rods can be retained in the retracted position shown in FIGURE 24 by entering the tip of the locking pin 155 in the hole 159.

In the use of the implement, the implement is drawn over the ground in the direction indicated by the arrow P in FIGURE 20, the tined body being rotated in the direction indicated by the arrow Q in FIGURE 21. As in the preivous embodiment, the crop or like material which is engaged by the tines is carried upwardly and rearwardly over the tined body along the concave surface of the baffles 65 and 110. The rearmost portion of the plate 112 is turned downwardly so that crop or like material leaves the implement in a downward direction.

The groups of guide rods constitute guide members for the crop or like material, the group 124 to 121 constituting a first guide member, the group 132 to 139 a second guide member and the two groups of rods 160 to 167 third and fourth guide members, respectively. Since the rods of the two groups located at the center of the baffle 110 are bent over through different angles, the rods form an oblique surface along which at least part of the crop or like material is moved so that the said crop is displaced laterally towards the opposite ends of the implement. Although the rods of the guide members located at the opposite ends of the baffle 110 are all bent over through the same angle, they are fixed in position relative to the obliquely inclined support plates 150 and thus also constitute inclined surfaces along which at least part of the crop or like material is guided laterally towards the center of the implement. The effect is to divide the tedded crop or like material into two separate swaths each of which has a width substantially smaller then half that of the tined body.

The oblique mounting of the shafts 154 about which the third and fourth guide members are turnable ensures that, if a guide member is turned in the direction indicated the arrow C in FIGURE 21, the free ends of the rods are moved closer to the center of the implement in addition to being brought closer to the surface of the ground. The nearer the free ends are brought to the surface of the ground, the smaller becomes the distance between them and the free ends of the rods of a cooperating guide member. The plates 118 serve to initiate the division of the tedded crop or like material into two separate parts and also serve to prevent loose crop or the like from becoming entangled with the mountings of the first and second guide members. It will be appreciated that these mountings lie between the two plates 118 considered in the intended direction of travel of the implement. The mountings of the third and fourth guide members are disposed beyond the side or end plates of the baffles 65 and 110 so that there is very little tendency for loose crop or like material to become entangled with these mountings. The guide rods are usually arranged in such a way that the free ends of the lowermost rods in each group are spaced from the surface of the ground by less than 30 centimeters. It is, in fact, preferred that this distance should be not more than 15 centimeters. During transport of the implement or when it is desired that the implement should perform a conventional tedding operation without the tedded crop or the like being divided into two separate swaths, the guide members are all turned into the retracted positions which have been described, in which positions they are located above the baffle 110. Thus, the width of the implement is substantially reduced during transport, it being remembered that the implement is drawn in a direction parallel to the length of the drawbar 52 in the position shown in broken lines in FIGURE 20 at such times. Moreover, the rods are out of the path of the crop of like material during a conventional tedding operation.

FIGURE 26 shows the means by which a side or end plate 113 of the baffle 110 is secured to the curved plate 112. The plate 113 is formed from a readily moldable synthetic material such as an armored synthetic plastic. A curved portion 170 of the plate 113 is thus formed integrally with the major portion of the plate and affords a transition between the plate 113 and the plate 112. The portion 170 has a rim 171 which is bent over slightly so that, when the plate 112 is brought into abutment therewith, a substantially smooth junction is formed on the outer or convex surface of the baffle. The rim 171 is secured to the overlapping edge of the plate 112 by a plurality of rivets 172, the said rivets having round heads on at least the inner or concave surface of the baffle in order to minimize any tendency for loose crop or like material to stick to them. It will be apparent that the baffle 65 can be formed in a similar maner and that baffles for use in connection with mechanisms other than the implement which have been described can be formed in a substantially identical manner.

What I claim is:

1. A tedder comprising a frame, a crop-working body rotatably mounted on said frame, guide means provided at the rear of said frame for concentrating and displacing crop material, said guide means being formed of a plurality of rods, some of said rods being comprised of several parts, as seen from above, the first of said parts defining a substantially vertical plane and being inclined to the longitudinal axis of said crop-working body, the second of said parts being remote from said frame and being inclined to said vertical plane and to the longitudinal axis of said crop-working body, said second parts diverging from one another and extending downwardly from said first parts whereby the free ends of said second parts extend in a fan shaped relationship as said guide means is viewed in a direction parallel to the longitudinal axis of said crop-working body, means for vertically adjusting and locking said guide means about a horizontal axis to secure said free ends in a plurality of positions relative to said crop-working body.

2. The invention of claim 1 wherein the guide means is comprised of at least one pair of guide members, the free ends of each of said paired members remote from said frame being inclined towards one another to define a convergent funnel shaped passage for said crop material.

3. The invention of claim 2 wherein the guide means is comprised of two pairs of guide members.

4. The invention of claim 2 wherein the guide members are turnable about a substantially horizontal axis and retractable to positions above said frame.

5. The invention of claim 1 wherein said crop-working body is a drum shaped tined body and said frame mounts a baffle over said body, the first of said parts of said guide means being connected to said baffle for initially securing crop material worked by said tined body.

6. The invention of claim 5 wherein said guide means is comprised of two pairs of guide members, the free ends of each of said paired members remote from said frame being inclined towards one another to define convergent funnel shaped passages for said crop material.

7. The invention of claim 6 wherein two plates are provided on the inner side of said baffle above said tined body.

8. The invention of claim 7 wherein said plates diverge gradually towards the rear of said baffle.

9. A tedder comprising a frame, a crop-working body rotatably mounted on said frame, guide means comprising at least one pair of guide members provided at the rear of said frame for concentrating and displacing crop material, each of said members being formed of a plurality of rods, some of said rods being comprised of several parts, as seen from above, the first of said parts defining a substantially vertical plane and being inclined to the longitudinal axis of said crop-working body, the second of said parts being remote from said frame and being inclined to the said vertical plane and to the longitudinal axis of said crop-working body, said second parts diverging from one another and being bent downwardly from said first parts whereby the free ends of said second parts extend in a fan shaped relationship as said guide means is viewed in a direction parallel to the longitudinal axis of said crop-working body, means for vertically adjusting and locking said guide means about horizontal axis to secure said free ends in a plurality of positions relative to said crop-working body the points at which the rods are bent being located on a line extending forwardly and obliquely downwards from the rear of the implement.

10. The invention of claim 9 wherein the first of said parts are parallel to one another.

11. The invention of claim 9 wherein the uppermost rod of each member extends obliquely downward.

12. The invention of claim 9 wherein the first of said parts are parallel to one another and to the uppermost rod.

13. The invention of claim 9 wherein said second parts are bent downwardly through an angle which is greater than that of the angle of bending of a rod above it.

14. The invention of claim 9 wherein at least some of the rods are arranged to abut against one another in pairs over a part of their lengths.

15. The invention of claim 9 wherein the said first parts become shorter from the uppermost to the lowermost rods.

16. A tedder comprising a frame, a crop-working body rotatably mounted on said frame, a hood mounted on said frame and extending about the forward and uppermost part of said rotatable body, guide means provided at the rear of said frame forming deflector surfaces for concentrating and displacing crop material, said guide means being inclined to the longitudinal axis of said crop-working body and being inclined at a substantial angle between the horizontal and the vertical, means for pivoting said guide means about a substantial angle between the horizontal and vertical for vertically adjusting and locking said guide means about a non-vertical axis to secure said guide means in a plurality of positions relative to said crop-working body.

17. A tedder comprising a frame, a crop-working drum rotatably mounted on said frame, guide means provided at the rear of said frame for concentrating and displacing crop material, said guide means being formed of a plurality of rods, parts of these rods being remote from said frame and being inclined at a substantial angle between the horizontal and vertical, said rods being inclined to the longitudinal axis of said crop-working body, means for pivoting said guide means about a substantial angle between the horizontal and vertical for vertically adjusting and locking said guide means about a non-vertical axis to secure said guide means in a plurality of positions relative to said crop-working body.

18. A tedder comprising a frame, a crop-working body rotatably mounted on said frame, a hood surrounding the forward and uppermost part of said rotatable body, guide means provided at the rear of said frame for concentrating and displacing crop material, said guide means being formed of a plurality of rods, means for vertically adjusting and locking said guide means about a horizontal axis more than 90° to secure said guide means in a plurality of positions relative to said crop-working body.

19. The invention of claim 17 wherein the non-vertical axis is inclined at an angle approximately halfway between the vertical and horizontal.

20. The invention of claim 18 wherein the horizontal axis is substantially parallel to the axis of rotation of the crop-working body.

References Cited by the Examiner

UNITED STATES PATENTS

| | | | |
|---|---|---|---|
| 1,056,122 | 3/13 | Reber | 56—192 |
| 2,254,672 | 9/41 | Arnold | 56—192 |
| 2,502,599 | 4/50 | Smart | 56—189 X |
| 2,636,335 | 4/53 | Whitney | 56—370 |
| 2,747,354 | 5/56 | Bloser. | |
| 2,750,726 | 6/56 | Boucard et al. | 56—25 |
| 2,751,745 | 6/56 | Magee | 56—192 X |
| 2,952,321 | 9/60 | Lyle et al. | 171—127 |
| 3,059,403 | 10/62 | Bamford et al. | 56—372 X |

FOREIGN PATENTS

| | | |
|---|---|---|
| 86,403 | 10/58 | Denmark. |

T. GRAHAM CRAVER, *Primary Examiner.*

RUSSELL R. KINSEY, *Examiner.*